United States Patent
Stolarczyk

(10) Patent No.: US 6,593,746 B2
(45) Date of Patent: Jul. 15, 2003

(54) METHOD AND SYSTEM FOR RADIO-IMAGING UNDERGROUND GEOLOGIC STRUCTURES

(76) Inventor: Larry G. Stolarczyk, 848 Clayton Hwy., Raton, NM (US) 87740

( * ) Notice: Subject to any disclaimer, the term of this patent is extended or adjusted under 35 U.S.C. 154(b) by 0 days.

(21) Appl. No.: 10/047,073

(22) Filed: Jan. 15, 2002

(65) Prior Publication Data

US 2003/0062902 A1 Apr. 3, 2003

Related U.S. Application Data

(60) Provisional application No. 60/315,149, filed on Aug. 27, 2001.

(51) Int. Cl.[7] .............................. G01V 3/12; G01V 3/30
(52) U.S. Cl. ...................................... 324/334; 324/338
(58) Field of Search ................................ 324/330, 331, 324/334, 335, 357, 202, 338, 339

(56) References Cited

U.S. PATENT DOCUMENTS

| | | | |
|---|---|---|---|
| 4,045,724 A | * 8/1977 | Shuck et al. ................. | 324/338 |
| 4,577,153 A | 3/1986 | Stolarczyk | |
| 4,691,166 A | 9/1987 | Stolarczyk | |
| RE32,563 E | 12/1987 | Stolarczyk | |
| 4,742,305 A | 5/1988 | Stolarczyk | |
| 4,753,484 A | 6/1988 | Stolarczyk et al. | |
| 4,777,652 A | 10/1988 | Stolarczyk | |
| 4,879,755 A | 11/1989 | Stolarczyk et al. | |
| RE33,458 E | 11/1990 | Stolarczyk | |
| 4,968,978 A | 11/1990 | Stolarczyk | |
| 4,994,747 A | 2/1991 | Stolarczyk | |
| 5,066,917 A | 11/1991 | Stolarczyk | |
| 5,072,172 A | 12/1991 | Stolarczyk et al. | |
| 5,087,099 A | 2/1992 | Stolarczyk | |
| 5,093,929 A | 3/1992 | Stolarczyk et al. | |
| 5,121,971 A | 6/1992 | Stolarczyk | |
| 5,146,611 A | 9/1992 | Stolarczyk | |
| 5,181,934 A | 1/1993 | Stolarczyk | |
| 5,188,426 A | 2/1993 | Stolarczyk et al. | |
| 5,260,660 A | 11/1993 | Stolarczyk | |
| 5,268,683 A | 12/1993 | Stolarczyk | |
| 5,301,082 A | 4/1994 | Stolarczyk et al. | |
| 5,408,182 A | 4/1995 | Stolarczyk et al. | |
| 5,474,261 A | 12/1995 | Stolarczyk et al. | |
| 5,600,246 A | * 2/1997 | Forgang et al. ............. | 324/339 |
| 5,610,523 A | * 3/1997 | Elliot .......................... | 324/330 |
| 5,686,841 A | 11/1997 | Stolarczyk et al. | |
| 5,769,503 A | 6/1998 | Stolarczyk et al. | |

* cited by examiner

*Primary Examiner*—N. Le
*Assistant Examiner*—Reena Aurora
(74) *Attorney, Agent, or Firm*—Richard B. Main

(57) ABSTRACT

A coal bed anomaly detection and imaging system comprises a synchronous transmitter and receiver that are separated by a geologic structure with embedded and hidden anomalies. The transmitter sends out two signals from magnetic dipole antennas. Such signals are widely separated in frequency but synchronized internally in the transmitter to one another. The higher frequency is used to make phase shift and attenuation measurements at the receiver by synchronous detection. The lower frequency is used at the receiver to synchronize the receiver to the transmitter. The higher frequency signal is measurably affected by anomalies in the intervening geologic structure. The lower frequency signal is fixed low enough so it is not substantially affected by the intervening geologic structure. Geologic modeling tools are preferably downloaded by geoscientists to their personal computers. The total attenuation and phase shift measurements are plugged into a full-wave inversion code (FWIC) process. A hypothetical model is uploaded for processing by a forward solver so the nature of the anomalous geologic structure can be estimated. A resulting reconstructed image of the anomalies in silhouette is then downloaded for interpretation of the image by the geoscientist.

15 Claims, 3 Drawing Sheets

METHOD AND SYSTEM FOR RADIO-IMAGING UNDERGROUND GEOLOGIC STRUCTURES

RELATED APPLICATIONS

This application is related to and claims priority of U.S. Provisional Patent Application serial No. 60/315,149, filed Aug. 27, 2001, and titled RADAR-NAVIGATION TOOL FOR MINING COAL. Such is incorporated herein by reference.

FIELD OF THE INVENTION

The present invention relates to ground-penetrating radars and coal mining, and more particularly to methods and systems for radio-imaging anomalous geology in coal bed deposits.

DESCRIPTION OF THE PRIOR ART

Given the growing need to produce cleaner run-of-mine (ROM) coal, improved information about the seam geology and coal quality in coal mine operations is of great value. The identification of anomalies is important so planning operations keep productivity high and cut cleaner coal. For example, the identification of a paleochannel anomaly before mining began would allow longwall panels to be laid out to avoid crossing it.

A natural coal seam waveguide occurs in layered sedimentary geology because the electrical conductivity of the bounding shale, mudstone, and fire clay, ranges between 0.01 and 0.1 Siemens per meter (S/m) (100 and 10 ohm-meters). Inside, the conductivity of the coal is near 0.0005 S/m (2,000 ohm-meters). The 10:1 conductivity contrast enables the waveguide travel of electromagnetic waves within the coal bed.

The electric field ($E_z$) component of a traveling electromagnetic wave (EM) is polarized in a vertical direction and the magnetic field ($H_y$) component is polarized horizontally in the seam. The energy in this part of the EM wave travels laterally in the coal seam from the transmitter to the radio imaging receiver. There is a horizontally polarized electric field ($E_x$) that has zero value in the center of the seam and reaches maximum value at the sedimentary rock-coal interface. This component is responsible for transmission of the electromagnetic wave signal into the boundary rock layer. The energy in this part of the EM wave travels vertically in the coal deposit.

The magnitude of coal seam radiowave decreases as it travels along the waveguide. The attenuation rate and cylindrical spreading of wave energy in the coal seam are two of the things at work that attenuate the travelling signals. The cylindrical spreading factor is $$\frac{1}{\sqrt{r}},$$

where r is the distance from the transmitting to receiving antenna. This factor compares with the non-waveguide far-field spherically spreading factor of $$\frac{1}{r}.$$

Thus, for a given separation of one-hundred meters, the magnitude of the seam EM wave decreases by ten in a waveguide, and by a factor of one-hundred in an unbounded media. So one advantage of sending signals down a seam waveguide is the much greater travel distance. Another advantage is that the traveling electromagnetic wave predominantly stays within the coal seam, the main item of interest.

A coal-seam electromagnetic wave is very sensitive to changes in the waveguide geometry and materials. The radiowave attenuation rate (decibels per 100 feet) and phase shift (electrical degrees per 100 feet) were determined by Dr. David Hill at the National Institute for Science and Technology (NIST). Dr. James Wait was the first to recognize that natural waveguides exist in the earth's crust. Both are Fellows in the Institute of Electrical and Electronic Engineers. The science underlying the traveling of an electromagnetic wave in the coal seam waveguide is well known. The engineering of both the crosshole transmitter and receiver has also been developed to a high degree of performance. The transmitter and receiver are synchronized to enable the measurement of total path phase shift from the transmitter to the receiver location. The total phase shift measurement is a distinguishing factor in the radio imaging-IV instrumentation. Prior art radio imaging instrumentation measures only the change in magnitude of radiowave, e.g., attenuation, when propagating in the coal seam waveguide.

The path length or distance a radio signal travels can be determined from attenuation measurements. In uniform-construction waveguides, the path is a straight line. The straight line path is an assumption used in the Algebraic Reconstruction Technique (ART) tomography algorithm. But radiowaves are refracted near significant geologic anomalies causing the travel path of the radiowave to bend and be longer than in the uniform waveguide case. This bending cannot be accounted for in ART processing and accounts for this distortion in the ART tomography processing algorithm. By measuring the total path phase shift, the bending effect can be accounted for in a new type of tomography reconstruction algorithm called Full-wave Inversion Code (FWIC) radio imaging IV acquires data that can be processed in the Sandia National Laboratories' WAIC algorithm. The effect of attenuation in the waveguide is to reduce the magnitude of the electromagnetic wave along the path.

Under sandstone sedimentary rock, the attenuation rate increases because more of the radio imaging signal travels vertically into the boundary rock, i.e., leaks from the waveguide. If water is injected into the coal, then clay in the coal causes the electrical conductivity to decrease and the attenuation rate/phase shift to increase.

The attenuation rate/phase shift rapidly increases with decreasing seam height. This coal seam thinning can be easily detected with radio imaging. The above graphical presentation of coal seam waveguide attenuation and phase constants represents the science factor in the art and science of interpreting radio imaging tomographic images. Higher attenuation rate zones suggest that either the coal seam boundary rock is changing, the seam is rapidly thinning, or/and water has been injected into the coal seam. Drilling and radar would determine the exact cause of the anomalous seam condition. This advance in the state of the art in mining would reduce both risk and cost in coal extraction.

Faults and dykes cause reflections to occur in the waveguide. The reflections can appear as excess path loss. Total phase shift measurements are useful in detecting reflection anomalies.

The predominating electromagnetic wave propagation mode in layers of coal is a "seam wave". Such is polarized in the plane of the seam, and has a uniform, polarized electric field orthogonal to the layer. In horizontal lying coal bed layers, the magnetic field will be horizontally polarized with the same field strength across a vertical cross-section. The electric field is vertically polarized. A third electric field is polarized in the horizontal plane and is maximum value at each boundary of the seam.

The horizontal component of the electric field is null near the physical center of the coal seam, albeit if the lower-resistivity boundary layers above and below are about equal in their respective material electrical resistivities.

The present inventor, Larry G. Stolarzyck, has described methods and equipment for imaging coal formations in geologic structures in many United States Patents. Some of those Patents are listed in Table I, and are incorporated herein by reference.

TABLE I

| Patent No. | Issued | Title |
| --- | --- | --- |
| U.S. Pat. No. 04577153 | Mar. 18, 1986 | Continuous Wave Medium Frequency Signal Transmission Survey Procedure For Imaging Structure In Coal Seams |
| U.S. Pat. No. 04691166 | Sep. 01, 1987 | Electromagnetic Instruments For Imaging Structure In Geologic Formations |
| U.S. Pat. No. 04742305 | May 03, 1988 | Method For Constructing Vertical Images Of Anomalies In Geological Formations |
| U.S. Pat. No. 04753484 | Jun. 28, 1988 | Method For Remote Control Of A Coal Shearer |
| U.S. Pat. No. 04777652 | Oct. 11, 1988 | Radio Communication Systems For Underground Mines |
| U.S. Pat. No. 04879755 | Nov. 07, 1989 | Medium Frequency Mine Communication System |
| U.S. Pat. No. 04968978 | Nov. 06, 1990 | Long Range Multiple Point Wireless Control And Monitoring System |
| U.S. Pat. No. 04994747 | Feb. 19, 1991 | Method And Apparatus For Detecting Underground Electrically Conductive Objects |
| U.S. Pat. No. 05066917 | Nov. 19, 1991 | Long Feature Vertical Or Horizontal Electrical Conductor Detection Methodology Using Phase Coherent Electromagnetic Instrumentation |
| U.S. Pat. No. 05072172 | Dec. 10, 1991 | Method And Apparatus For Measuring The Thickness Of A Layer Of Geologic Material Using A Microstrip Antenna |
| U.S. Pat. No. 05087099 | Feb. 11, 1992 | Long Range Multiple Point Wireless Control And Monitoring System |
| U.S. Pat. No. 05093929 | Mar. 03, 1992 | Medium Frequency Mine Communication System |
| U.S. Pat. No. 05121971 | Jun. 16, 1992 | Method Of Measuring Uncut Coal Rib Thickness In A Mine |
| U.S. Pat. No. 05146611 | Sep. 08, 1992 | Mine Communication Cable And Method For Use |
| U.S. Pat. No. 05181934 | Jan. 26, 1993 | Method For Automatically Adjusting The Cutting Drum Position Of A Resource Cutting Machine |
| U.S. Pat. No. 05188426 | Feb. 23, 1993 | Method For Controlling The Thickness Of A Layer Of Material In A Seam |
| U.S. Pat. No. 05260660 | Nov. 09, 1993 | Method For Calibrating A Downhole Receiver Used In Electromagnetic Instrumentation For Detecting An Underground Conductor |
| U.S. Pat. No. 05268683 | Dec. 07, 1993 | Method Of Transmitting Data From A Drillhead |
| U.S. Pat. No. 05301082 | Apr. 05, 1994 | Current Limiter Circuit |
| U.S. Pat. No. 05408182 | Apr. 18, 1995 | Facility And Method For The Detection And Monitoring Of Plumes Below A Waste Containment Site With Radiowave Tomography Scattering Methods |
| U.S. Pat. No. 05474261 | Dec. 12, 1995 | Ice Detection Apparatus For Transportation Safety |

TABLE I-continued

| Patent No. | Issued | Title |
| --- | --- | --- |
| U.S. Pat. No. 05686841 | Nov. 11, 1997 | Apparatus And Method For The Detection And Measurement Of Liquid Water And Ice Layers On The Surfaces Of Solid Materials |
| U.S. Pat. No. 05769503 | Jun. 23, 1998 | Method And Apparatus For A Rotating Cutting Drum Or Arm Mounted With Paired Opposite Circular Polarity Antennas And Resonant Microstrip Patch Transceiver For Measuring Coal, Trona And Potash Layers Forward, Side And Around A Continuous Mining Machine |
| U.S. Pat. No. RE032563 | Dec. 15, 1987 | Continuous Wave Medium Frequency Signal Transmission Survey Procedure For Imaging Structure In Coal Seams |
| U.S. Pat. No. RE033458 | Nov. 27, 1990 | Method For Constructing Vertical Images Of Anomalies In Geological Formations |

In underground coal mining practice, horizontal magnetic dipole antennas can be driven by a radio transmitter so a seam wave will propagate within the coal, or other layer of higher-resistivity media. A remote, horizontal magnetic dipole receiving antenna is then used to measure the seam wave with a receiver synchronized to the transmitter. Fiber-optic cables are preferably used for the receiver-transmitter synchronization, e.g., because a metallic cables would interfere with reception by receiving the transmitted signals, and re-radiating them to compete with the direct signal to the receiver. Phase coherent receiver design allows synchronous detection and accurate phase measurements of the direct signal. The effects on direct signal phase help elicit the nature of the coal layer, given a priori or concomitant material dielectric-constant measurements.

However, the logistics of providing the synchronization cable can prove impossible in some mines and in some applications. So it would be desirable to synchronize such transmitters and receivers without requiring a cable between the receiver and transmitter.

SUMMARY OF THE INVENTION

It is therefore an object of the present invention to provide an instrument for the detection and high-resolution imaging of anomalous geologic structures.

It is another object of the present invention to provide an imaging method for simultaneously transmitting a synchronizing and an imaging electromagnetic wave from a single location for phase coherent detection by a receiver.

It is still another objective of the present invention to provide a method of receiver phase coherency with a transmitter and thereby obtain maximum receiver threshold sensitivity when measuring total attenuation and phase shift of imaging electromagnetic waves passing through a geologic target.

It is still another object of the present invention to provide a full-wave inversion code method in the reconstruction of imaging of anomalous geology when the ray path assumption in the algebraic reconstruction algorithm becomes invalid.

Briefly, a coal bed anomaly detection and imaging embodiment of the present invention comprises a synchronous transmitter and receiver that are separated by a geologic structure with embedded and hidden anomalies. The transmitter sends out two signals from magnetic dipole antennas. Such signals are widely separated in frequency but synchronized internally in the transmitter to one another. The higher frequency is used to make phase shift and attenuation measurements at the receiver by synchronous detection. The lower frequency is used at the receiver to synchronize the receiver to the transmitter. The higher frequency signal is measurably affected by anomalies in the intervening geologic structure. The lower frequency signal is fixed low enough so it is not substantially affected by the intervening geologic structure. Geologic modeling tools are preferably downloaded by geoscientists to their personal computers. The total attenuation and phase shift measurements are plugged into a full-wave inversion code (FWIC) process. A hypothetical model is uploaded for processing by a forward solver so the nature of the anomalous geologic structure can be estimated. A resulting reconstructed image of the anomalies in silhouette is then downloaded for interpretation of the image by the geoscientist.

An advantage of the present invention is a system is provided that eliminates the need for a synchronization cable wired between a transmitter and a receiver.

Another advantage of the present invention is a method is provided for the measurement of the total attenuation and phase shift of an imaging electromagnetic wave after its having propagated through a geologic target.

A further advantage of the present invention is an image reconstruction code is provided in a method that is not invalidated by refraction, reflection, and scattering of an imaging electromagnetic wave in a geologic target.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
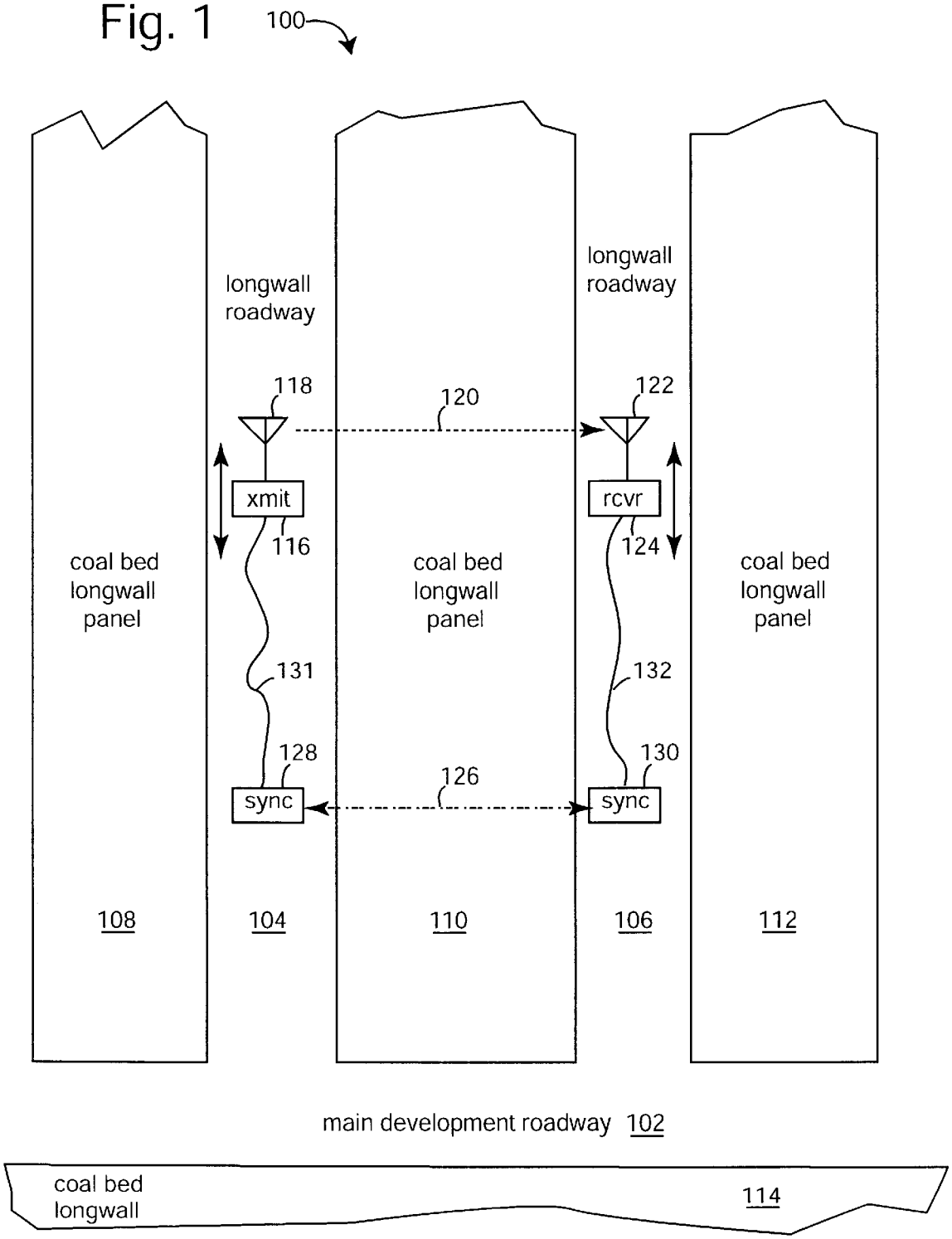
FIG. 1 is a plan-view diagram of an underground, longwall coal mining operation that is being imaged between roadways for anomalies by a radio probe system embodiment of the present invention.

FIG. 1 represents an underground, longwall coal mining operation 100 in plan view. A main development roadway 102 has several branching longwall roadways, e.g., roadways 104 and 106. These roadways are cut between a number of coal bed longwall panels 108, 110, 112, and 114. Railroads and trains are typically used in the main development roadway 102 to haul-out the coal being mined. The typical, modern longwall coal mining operation 100 uses the so-called room-and-pillar method where large pillars of coal are left to support the roof and thereby prevent surface subsidence. The parts of the roof between the pillars are typically reinforced with six-foot long roof bolts. The roadways and panels between them can stretch several thousand feet in length. The panels are typically eight hundred feet wide. Conveyor belts and shuttle cars are used to move the coal from the cut faces to the train cars.

The coal bed longwall panels 108, 110, 112, and 114, can, and usually do include anomalies, that are best left uncut and used for the roof-supporting pillars. Such anomalies can comprise faults, water, sandstone, limestone, and other materials lacking coal and/or presenting potential mining hazards. For example, punching into an underground spring can flood the mine and require expensive pumping and long delays in getting the water cleared out.

In the past, using conventional methods and equipment, these anomalies were not discovered until actually encountered. Knowing where these anomalies lie early in the mine development, can allow better planning of the overall mining operation, and allow the optimum room-and-pillar geometries and placements. Some traditional methods exist for developing a rough idea of the size, nature, and orientation of anomalies, but the electronic systems and methods described herein allow much better pictures and assessments to be had.

Embodiments of the present invention permit the longwall panels to be electronically imaged by passing radio waves through them. In particular, the ways these radio waves are affected can be interpreted as showing anomalies in the otherwise homogeneous coal deposits. The anomalies will impart a different phase shift and attenuation on the radio waves than will coal. But such measurements require synchronous-detection by the receiver.

Therefore, an anomaly-imaging system embodiment of the present invention includes a transmitter 116 with a transmitting antenna 118 that beams out a radio signal 120. The longwall panel 110, for example, will impart a phase shift and attenuation to the radio signal that will be observed by a receiving antenna 122 and a receiver 124. A synchronizing, wireless signal 126 is exchanged between a pair of synchronizers 128 and 130. The frequency of wireless signal 126 is preferably in the range of 500–5000 Hz, so the attenuation and total phase shift it experiences passing through longwall panel 110 will be relatively small. A fiberoptic cable 131 provides a synchronizing clock from synchronizer 128 to transmitter 116. Similarly, a fiberoptic cable 132 provides a synchronizing clock from synchronizer 130 to receiver 124.

In order to collect tomographic data so an image of the anomalies can be reconstructed, the transmitter 116, its antenna 118, the receiver 124 and its antenna 122 are respectively moved up and down roadways 104 and 106. This allows signal 120 to cut through the longwall panel 110 at may different perspectives, and the phase and attenuation experienced with each transmitter and receiver location is logged into a database. The images of the hidden anomalies can be tomographically processed from the database in real-time or in post processing.

The construction of the transmitter 116 and the receiver 124, as well as the methods used to reconstruct tomographic images of underground anomalies and of coal deposits are suggested and described in many of the present inventor's previously issued patents. For example, the reader is referred to U.S. Pat. Nos. 4,691,166, issued Sep. 1, 1987; 4,577,153, issued Mar. 18, 1986; Re-Exam 32,563, issued Dec. 15, 1987; 4,742,305, issued May 3, 1988; 5,408,182, issued Apr. 18, 1995, and Re-Exam 33,458, issued Nov. 27, 1990. All such Patents are incorporated herein by reference.

In embodiments of the present invention, it is assumed to be impractical to string a cable between synchronizers 128 and 130. So it is a critical part of the present invention that the communication between synchronizers 128 and 130 must be wireless. Power supply cords and utility power sources can also be impractical, so battery operation is necessitated for the transmitter 116, receiver 124, and synchronizers 128 and 130.

Synchronization enables the detection and measurement of the smallest sinusoidal signal embedded in electrical noise. When the receiver design is phase coherent with the synchronization signal and synchronous detection is employed in the receiver, the attenuation rate (alpha) and phase shift (beta) of an electromagnetic wave propagating between the transmitting and receiving magnetic dipole antennas can be measured. As used herein, H is the magnitude of the magnetic field threading the area of the magnetic dipole;

W 2·f and f is the frequency in Hertz;

$\mu o$ is the magnetic permeability of free space;

A is the area in square meters of the magnetic dipole;

$\mu r$ is the relative permeability of the material upon which the coils of wire are wound; and N is the number of turns.

Images of geologic structure are constructed by dividing the geologic region into pixels included a plane between locations visited by the receiver and transmitter. Lines between the locations visited represent the edges of the image plane. The width and height of each pixel is arbitrary, but is usually made unequal to the physical space between each transmitter and receiver location. One method of determining the electromagnetic wave propagation constants in each pixel is the well-known Algebraic Reconstruction Technique (ART) described in U.S. Pat. No. 5,260,660, issued Nov. 9, 1993.

The ART method assumes an electromagnetic wave propagation will follow a straight line path between the transmitter and receiver locations. Such assumption is reasonably valid in a uniform geologic setting with anomalies. Anomalous geology can be mapped with distortion in the image aligned along the majority of ray paths. As the degree of geologic disturbance increases, the electromagnetic wave phenomena of refraction, reflection, and scattering increases and invalidates the ray path assumption in ART. Images reconstructed with the invalid assumption exhibit artifacts, e.g., false images, in the image plane.

Clearly, it would be desirable to have a synchronized electromagnetic wave instrumentation that would not be logistically constrained by requiring deployment of a synchronizing cable. Further, it would be desirable to have an image reconstruction algorithm that would not require a straight ray path assumption and that could account for electromagnetic wave propagation phenomena of refraction, reflection, and scattering in the geologic target.

The need for a synchronization cable is eliminated by simultaneously transmitting a low-frequency electromagnetic wave 126 and the imaging-frequency signal 120. Because attenuation increases with frequency, the lower frequency, synchronization signal will propagate further. The carrier frequency of the synchronization signal 126 is preferably in the range of 500–5,000 Hertz. The electrical conductivity ($\sigma$), dielectric constant ($\epsilon$), and magnetic permeability ($\mu$) all have an impact on the attenuation rate ($\alpha$) and phase constant ($\beta$). These so-called quasi-static conditions and the synchronization signal constant can be readily determined.

The synchronization receiver produces an output sync signal, which establishes the image signal receiver condition of phase coherency with the transmit signal. The phase of the received signal relative to the transmit signal can be measured. The instrumentation can measure the total phase shift in the electromagnetic wave when propagating from the transmitter to receiver location. Concurrently, the total attenuation of the imaging signal can be measured. The magnitude and total phase shift of the electromagnetic wave can be measured.

The total field measurement enables the use of the full-wave inversion code (FWIC), a newly developed image forming algorithm. The FWIC is defined as $E_T = E_i + E_s = E_b + \int \sigma E_t G(r_i r^1) dr$, where $E_O$ is the total electric field measured by the receiver 124, Ei is the incident electric field calculated at a point in the longwall panel 110, G is the electrical conductivity distribution within the longwall panel 110, $G(r_i r^1)$ is the Green's function which accounts for wave propagation of the electromagnetic wave phenomena generated by an anomalous geologic structure.

The FWIC requires a forward modeling algorithm to determine the magnitude and phase of the incident wave everywhere within the geologic target. According to Maxwell's well-known equations, the incident electric field produces both conduction and displacement current flow in the target. Conduction current predominates when $\sigma/\omega\epsilon > 1$, and displacement current predominates when $\sigma/\omega\epsilon << 1$. By measuring the total field at each location, an iterative procedure is used to solve for the conductivity variation in the geologic target. The FWIC code does not require the straight ray path assumption and enables imaging reconstruction where anomalous geology causes wave propagation phenomena of refraction, reflection, and scattering to occur within the geologic target. See also, U.S. Pat. No. 5,408,182, issued Apr. 18, 1995.

The anomalous geology images will not rise to photographic-quality pictures. For example, anomalous geologic objects can appear in silhouettes in the image plane. Unknown geologic target images require interpretation by an expert, and involve art and science.

Figure 2:
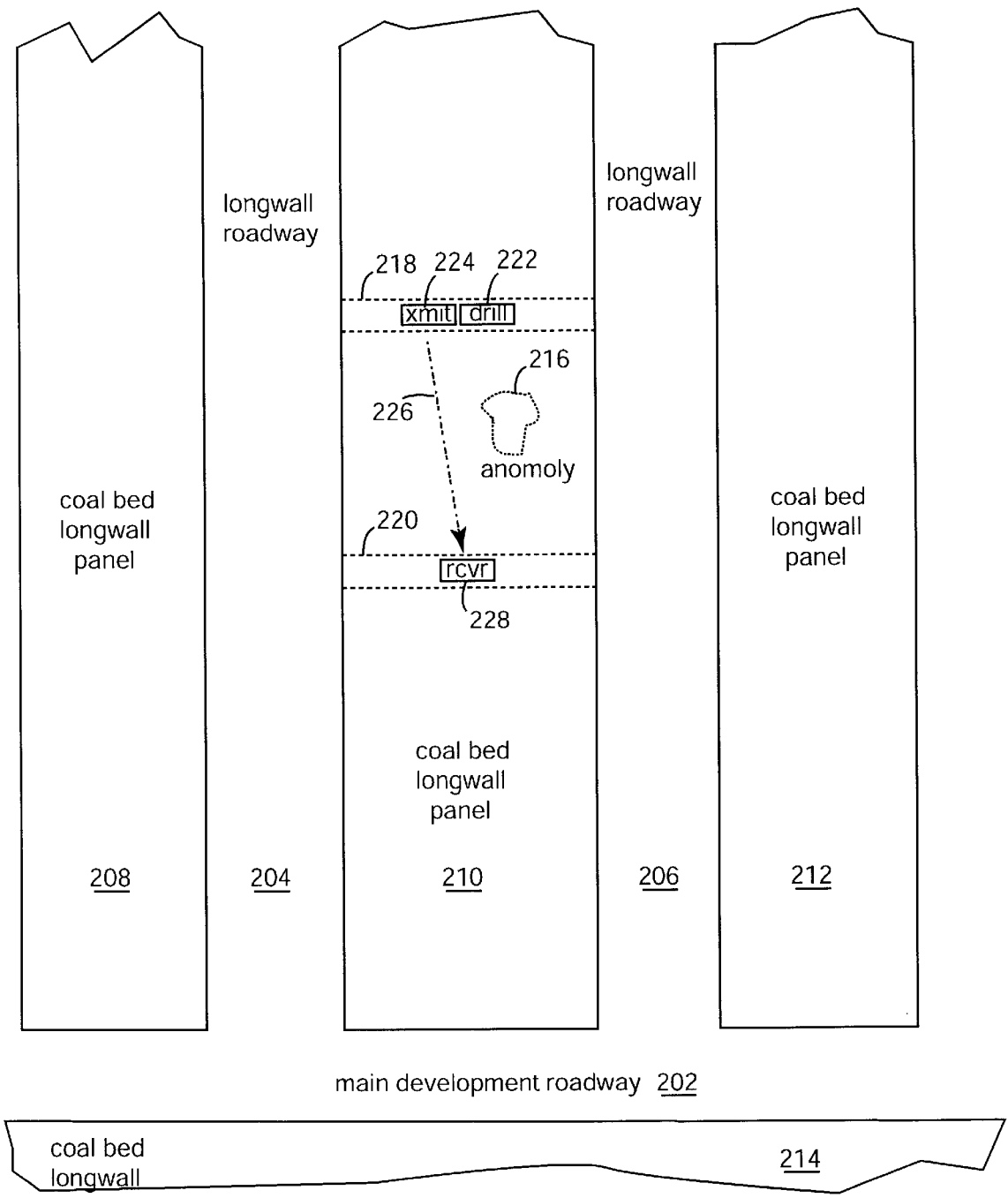
FIG. 2 is a plan-view diagram of another underground, longwall coal mining operation that is being imaged between boreholes in the longwall panel for anomalies by a drillstring radio probe system embodiment of the present invention.

FIG. 2 represents another underground, longwall coal mining operation 200, e.g., like that of FIG. 1 but in another stage of development. As before, a main development roadway 202 has several branching longwall roadways, e.g., roadways 204 and 206. These roadways are cut between a number of coal bed longwall panels 208, 210, 212, and 214. The coal bed longwall panels 208, 210, 212, and 214, can, and usually do include anomalies, e.g., anomaly 216. Such anomalies can comprise faults, water, sandstone, limestone, and other materials lacking coal and/or presenting potential mining hazards.

Embodiments of the present invention permit the longwall panels to be electronically imaged for anomalies by passing through a combined high frequency probe radio wave and a low-frequency synchronizing radio wave. In FIG. 2, these signals are passed between de-gasification boreholes 218 and 220.

Methane is conventionally degassed from the longwall panels by boring a series of horizontal bores spaced only a few hundred feet apart. For example, borehole 220 was drilled and degassed before borehole 218. A drillhead 222 is shown in the process of drilling borehole 218 and is fitted on its aft end with a transmitter 224. A drillstring is not shown. A dual-frequency signal 226 is emitted by transmitter 224 and is detected by a synchronous receiver 228. The dual-frequency signal 226 includes a high-frequency probe component that is substantially affected in signal strength and phase by anomaly 216. The dual-frequency signal 226 further includes a low-frequency synchronizing component that is not substantially affected by anomaly 216. The low-frequency synchronizing component is recovered in the receiver 228 to synthesize a synchronous local oscillator, and such enables synchronous detection of the high-frequency probe component.

Figure 3:
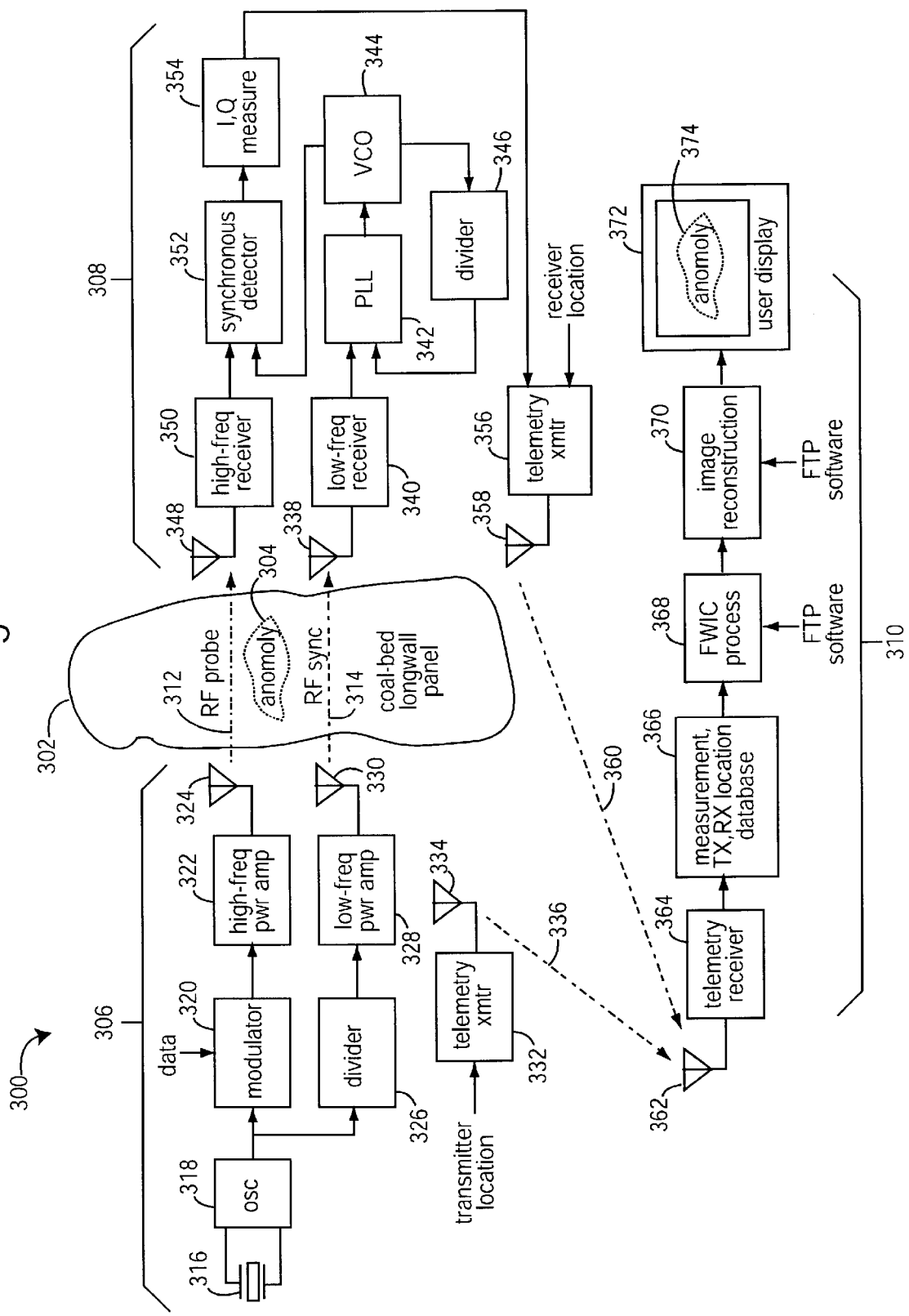
FIG. 3 is a function block diagram of a radio probe system embodiment of the present invention useful in the systems shown in FIGS. 1 and 2.

FIG. 3 is an anomaly imaging system embodiment of the present invention, and is referred to herein by the general reference numeral 300. The system 300 can be used effectively in the situations shown in FIGS. 1 and 2. The system 300 is used to image a coal-bed longwall panel 302 for an anomaly 304. A probe transmitter 306 is positioned on one side, and a probe receiver 308 is positioned on the other side. An anomaly image processing sub-system 310 receives information about the real physical locations of probe transmitter 306 and probe receiver 308. It further receives measurements of the signal strength and phase shifts experienced by an RF-probe signal 312. An RF-synchronizing signal 314 is used to convey transmitter synchronization information for synchronous detection by the receiver 308. Such RF-synchronizing signal 314 has a much lower carrier frequency than the RF-probe signal 312, e.g., 500–5000 Hz. Because the signal frequency is in the range of 500–5000 Hz, the attenuation and total phase shift is small. The total phase shift in the synchronization electromagnetic wave can thus be analytically determined. The RF-probe signal 312 typically operates in the range of 0.5–1.5 MHz.

A crystal 316 provides a reference frequency to an oscillator 318. A modulator 320 accepts data that can be impressed on the RF-probe signal 312. A high-frequency radio power amplifier 322 builds up the signal for emission by a high-frequency transmitter antenna 324, e.g., a ferrite-core magnetic dipole type. A divider 326 provides a synchronous low frequency for a low-frequency radio power amplifier 328. The amplified RF-synchronizing signal 314 is output by a low-frequency transmitter antenna 330, e.g., another ferrite-core magnetic dipole type. The real physical position of the transmitter antenna 324 is sent by a telemetry transmitter 332 out through an antenna 334 on a signal 336. Such transmitter information could alternatively be included in the data being input at modulator 320, and the telemetry transmitter 332 would not be necessary. The real physical position of the transmitter antenna 324 is needed in later tomographic processing to reconstruct an image of anomaly 304.

A low-frequency receiving antenna 338 captures the RF-synchronizing signal 314 for recovery of the carrier output by divider 326. A low-frequency receiver 340 provides this signal for comparison in phase and locking by a phase locked loop (PLL) 342. This drives a voltage controlled oscillator (VCO) 344 to output the higher frequency being input to divider 326 and transmitter as RF-probe signal 312. A divider 346 helps accomplish this by having the same division as in divider 326.

The RF-probe signal 312 is received for measurement by a high-frequency antenna 348 and receiver 350. A synchronous detector 352 detects the carrier signal to reveal any attenuation and phase shift affects caused by the anomaly 304. An in-phase (I) and quadrature-phase (Q) measurement is taken by a sampler 354 and forwarded to a telemetry transmitter 356. The real physical position of receiving antenna 348 is also transmitted by a telemetry antenna 358 as a receiver telemetry signal 360. In alternative embodiments, the position information of transmitter antenna 324 may be included if it was sent by modulator 320.

The receiver 308 can be pushed along in a recently completed de-gas hole with ten-foot length fiber rod sections. A companion transmitter may be built into a measure-while-drilling (MWD) instrument and tomography scans are conducted during normal drilling, e.g., so as to not slow down coal bed methane (CBM) drilling. The receiver in the prior drillhole is maneuvered with the push rods to acquire the tomographic data. It is possible to line the hole with plastic pipe and use water pressure to maneuver the receiver during a tomographic scan.

On standing longwall panels, it is cost effective to first do a cross entry survey. The direct ray scan would acquire data at 50-ft intervals along the panel. The tomography scan would acquire diagonal path data from each 50-ft measuring station. This would locate geologic disturbance zones where CBM crosshole radio imaging is applied. Also, the radar is directed into these zones. In other words, radio imaging crosshole would only be used in geologic disturbance zones.

A telemetry antenna 362 and receiver 364 receive information about the locations of RF-probe antennas 324 and 348, as well as the I,Q measurement information from sampler 354. The locations of RF-probe antennas 324 and 348 indicate the ray path of RF-probe signal 312. The I,Q measurement information indicates whether that ray path was affected and to what degree by the anomaly 304. All this information is stored in a database 366 for real-time or post processing. A full-wave inversion code (FWIC) process is used together with an image reconstruction process 370 to build a display image for a user display 372. A silhouette 374 in a graphic image is used to represent the real anomaly 304.

For the most part, image interpreting geoscientists and other users have prerequisite skills and training in electromagnetic wave theory. However, refraction, reflection, and scattering increase the uncertainties in the image because the assumption of a straight ray path becomes erroneous. Software tools can be downloaded (FTP) to the geoscientist's personal computer, e.g., over the Internet. Using simple layered models of hypothetical geology, the geoscientist can introduce the suspect geologic anomaly into the generic model and determine its electromagnetic wave response using mathematical forward modeling code. The hypothetical model can be uploaded to a data processing center where a forward modeling algorithm resides in an operating program. The forward model output would be the total electromagnetic wave fields measurable at each receiver location.

These modeled data would also be processed, e.g., in the FWIC 368, to form a hypothetical image. Also, the hypothetical image can be downloaded to the geoscientist to improve scientific objectivity in the data interpretation.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. An anomaly sensing system, comprising:
a transmitter providing for at least one RF-probe signal and one RF-synchronizing signal at substantially different carrier frequencies and yet synchronous to one another;
a coherent receiver having a frequency synthesizer able to lock on to said RF-synchronizing signal and providing for synchronous detection of said RF-probe signal; and
a measurement device for detecting attenuation and phase shift affects on said RF-probe signal by an anomalous media that intervenes between the transmitter and receiver;

wherein, synchronization between the transmitter and coherent receiver is accomplished wirelessly and without a synchronizing cable, and such synchronization provides for the detection and measurement of small sinusoidal signals embedded in electrical noise, and synchronous detection is used in the receiver to measure the attenuation rate (alpha) and phase shift (beta) of an electromagnetic wave propagating between the transmitting and a receiving magnetic dipole antenna can be measured; and wherein, images of geologic structure are constructed by dividing a geologic region into pixels or boxels include a lane or volume between location visited by the receiver and transmitter, and lines between the locations visited represent the edges of the image plane, and the depths width and height of each pixel or boxel is arbitrary, but is usually made unequal to the physical space between each transmitter and receiver location, and the electromagnetic wave propagation constants in each pixel are determined by an image reconstruction process that does not require a straight ray path assumption and that accounts for electromagnetic wave propagation phenomena of refraction, reflection, and scattering in a geologic target.

2. The system of claim 1, wherein:

the transmitter is disposed in a first passageway in an underground coal mine;

the receiver is disposed in a second passageway in an underground coal mine; and the measurement device provides for measurements of any anomalies lying between said first and second passageways.

3. The system of claim 1, wherein:

the transmitter visits a number of locations in a first passageway in an underground coal mine;

the receiver visits a number of locations in a second passageway in an underground coal mine; and the measurement device provides for tomographic measurements of anomalies intersected by ray paths between said locations along said first and second passageways.

4. The system of claim 1, further comprising:

a drillstring and drillhead for drilling boreholes in coal deposits, and which carries the transmitter along a number of transmitting locations in a borehole in an underground coal mine.

5. The system of claim 1, wherein:

the transmitter is attached to a drillhead in a borehole for transmitting from a number of different locations an underground coal mine.

6. The system of claim 1, wherein:

the receiver is disposed in a borehole and provides for reception of signals from the transmitter in another borehole in an underground coal mine.

7. The system of claim 1, further comprising:

means for repositioning the receiver in a borehole, and that provides for reception of signals from the transmitter in another borehole in an underground coal mine.

8. The system of claim 1, further comprising:

a tomographic processor for generating an image of any anomaly in said anomalous media that was intersected by said RF-probe signal.

9. The system of claim 1, wherein:

the transmitter and receiver are such that said RF-probe signal is at a carrier frequency that is substantially affected in signal amplitude and phase by anomalies in said anomalous media that are intersected by said RF-probe signal.

10. The system of claim 1, wherein:

the transmitter and receiver are such that said RF-synchronizing signal is at a carrier frequency that is not substantially affected in signal amplitude and phase by anomalies in said anomalous media.

11. The system of claim 1, further comprising:

a synchronous detector disposed in the receiver and able to use said RF-synchronizing signal to measure the strength and phase of said RF-probe signal.

12. The system of claim 1, further comprising:

a tomographic image reconstruction processor for employing full-wave inversion code (FWIC) to account for the affects of refraction, reflection, and bending of said RF-probe signal between the transmitter and receiver.

13. The system of claim 1, further comprising:

a tomographic image-reconstruction processor for displaying a graphic representation of an anomaly that lies hidden in the ground between the transmitter and receiver.

14. The system of claim 1, further comprising:

means for using simple layered models of hypothetical geology and introducing a suspect geologic anomaly into a generic model to determine its electromagnetic wave response using mathematical forward modeling code in which the forward model output is the total electromagnetic wave fields measurable at each receiver location.

15. The system of claim 14, further comprising:

means for processing modeled data with full-wave inversion code (FWIC) to form a hypothetical image.

* * * * *